US010011925B2

(12) United States Patent
Kurahashi et al.

(10) Patent No.: US 10,011,925 B2
(45) Date of Patent: Jul. 3, 2018

(54) CONDUCTIVE STRETCHABLE KNITTED FABRIC AND HARNESS FOR CONDUCTION

(71) Applicant: GUNZE LIMITED, Ayabe-shi, Kyoto (JP)

(72) Inventors: Takaomi Kurahashi, Ayabe (JP); Hideki Tanaka, Moriyama (JP); Yoshimi Tanaka, Ayabe (JP)

(73) Assignee: GUNZE LIMITED, Ayabe-Shi (JP)

( * ) Notice: Subject to any disclaimer, the term of this patent is extended or adjusted under 35 U.S.C. 154(b) by 0 days.

(21) Appl. No.: 15/558,920

(22) PCT Filed: Mar. 2, 2016

(86) PCT No.: PCT/JP2016/056462

§ 371 (c)(1),
(2) Date: Sep. 15, 2017

(87) PCT Pub. No.: WO2016/181690

PCT Pub. Date: Nov. 17, 2016

(65) Prior Publication Data

US 2018/0073172 A1 Mar. 15, 2018

(30) Foreign Application Priority Data

May 14, 2015 (JP) ................................ 2015-099135
Jul. 15, 2015 (JP) ................................ 2015-141500

(51) Int. Cl.
*H02G 3/04* (2006.01)
*D04B 1/18* (2006.01)
(Continued)

(52) U.S. Cl.
CPC ................ *D04B 1/18* (2013.01); *D02G 3/32* (2013.01); *D02G 3/441* (2013.01); *H01B 3/48* (2013.01); *H01B 7/0045* (2013.01)

(58) Field of Classification Search
CPC . D04B 1/18; D02G 3/441; D02G 3/32; H01B 3/48; H01B 7/0045
(Continued)

(56) References Cited

U.S. PATENT DOCUMENTS 4,664,158 A * 5/1987 Sands ...................... A61N 1/14
139/422
2004/0237494 A1* 12/2004 Karayianni ........... D02G 3/328
57/212

(Continued)

FOREIGN PATENT DOCUMENTS

CN 1628564 A 6/2005
CN 201186980 Y 1/2009

(Continued)

OTHER PUBLICATIONS

International Search Report for PCT/JP2016/056462 (PCT/ISA/210) dated May 17, 2016.

*Primary Examiner* — Sherman Ng
(74) *Attorney, Agent, or Firm* — Birch, Stewart, Kolasch & Birch, LLP

(57) ABSTRACT

In a harness for conduction, a knitted fabric that despite having high stretchability and flexibility as well as restorability at the time of repeated elongation, has the characteristics that a change in electrical resistance is zero or suppressed between elongation and non-elongation has never been available. A conductive part knitted using a conductive yarn and an elastic yarn simultaneously, and a non-conductive part knitted using only a non-conductive yarn are provided, in which the conductive part is such that at least the conductive yarn is provided in a zigzag arrangement in a front-back direction in a knitted fabric, and the elastic yarn is provided in an arrangement that generates a tightening force along a surface direction parallel to the front and back surfaces of the knitted fabric to keep the shape of the zigzag (Continued)

arrangement of the conductive yarn, the conductive part includes a constituent path employing a metallic wire as the conductive yarn, and the non-conductive part includes a constituent path employing a synthetic fiber as the non-conductive yarn.

1 Claim, 5 Drawing Sheets

(51) Int. Cl.

| | |
|---|---|
| ***D02G 3/44*** | (2006.01) |
| ***H01B 3/48*** | (2006.01) |
| ***H01B 7/00*** | (2006.01) |
| ***D02G 3/32*** | (2006.01) |

(58) Field of Classification Search
USPC ........................................................ 174/72 A
See application file for complete search history.

(56) References Cited

U.S. PATENT DOCUMENTS

| | | | | |
|---|---|---|---|---|
| 2006/0213767 | A1 | 9/2006 | Anaf | |
| 2006/0264137 | A1 | 11/2006 | Ishihara et al. | |
| 2006/0281382 | A1 * | 12/2006 | Karayianni | D03D 1/0088 442/181 |
| 2009/0018428 | A1 * | 1/2009 | Dias | A41D 13/1281 600/388 |
| 2009/0218002 | A1 * | 9/2009 | Kashihara | D03D 1/0041 139/433 |
| 2013/0260630 | A1 * | 10/2013 | Ito | D03D 1/00 442/205 |
| 2013/0319053 | A1 | 12/2013 | Park et al. | |
| 2015/0246776 | A1 | 9/2015 | Shoji et al. | |

FOREIGN PATENT DOCUMENTS

| | | | |
|---|---|---|---|
| CN | 201678812 | U | 12/2010 |
| CN | 201947969 | U | 8/2011 |
| EP | 2 518 225 | A1 | 10/2012 |
| JP | 3-166797 | A | 7/1991 |
| JP | 4-248209 | A | 9/1992 |
| JP | 5-214646 | A | 8/1993 |
| JP | 3055556 | U | 1/1999 |
| JP | 2000-221 | A | 1/2000 |
| JP | 2006-524747 | A | 11/2006 |
| JP | 2007-191811 | A | 8/2007 |
| JP | 2012-177210 | A | 9/2012 |
| JP | 2012-197521 | A | 10/2012 |
| JP | 3183574 | U | 5/2013 |
| JP | 3183657 | U | 5/2013 |
| JP | 2016-216836 | A | 12/2016 |
| KR | 10-1259994 | B1 | 5/2013 |
| WO | WO 2014/049816 | A1 | 4/2014 |

* cited by examiner

CONDUCTIVE STRETCHABLE KNITTED FABRIC AND HARNESS FOR CONDUCTION

TECHNICAL FIELD

The present invention relates to a conductive stretchable knitted fabric that despite having high stretchability and flexibility as well as restorability at the time of repeated stretching, has the characteristics that even after repeated stretching, a change in electrical resistance is zero or suppressed, and to a harness for conduction using the conductive stretchable knitted fabric.

The present invention relates to a solder-resistant conductive harness that despite having high flexibility against a bend or a twist, can prevent the occurrence of a disadvantageous short circuit, and that can be soldered in an arbitrary position and as necessary further configured to be provided with stretchability as well.

BACKGROUND ART

In the past, there has been proposed a sheet that is knitted or woven with a conductive part and a non-conductive part alternately arranged (Patent Literature 1). In this sheet, one of options has been that the conductive part is knitted or woven using a metallic yarn such as a gold, silver, or copper yarn. Also, it has been assumed that at the time of weaving, the conductive yarn is used as the warp.

On the other hand, there has been proposed a fabric that is arranged with a stretchable transmission line and configured to be capable of, even when repeatedly stretched, suppressing disconnection or ground fabric damage (Patent Literature 2). In this fabric, as the stretchable transmission line, one configured by twisting 4 collective wires each formed of a bundle of 100 copper wires having a diameter of 0.03 mm around a braid having a diameter of 1.8 mm, and around the resulting wire, further twisting a false-twist textured yarn doubly (in a two-layer manner) is only exemplified.

In the past, there has been proposed a wiring material that is configured to sandwich conductive wires by arranging the conductive wires on an insulating film and coating the surface of the insulating film where the conductive wires are arranged with a flexible insulating material (Patent Literature 3).

Also, there has been proposed a bipolar plate that is configured by using a polymer wall as a core material, on the front surface side thereof, providing a first electrode in a semi-embedded manner to expose it, on the back surface side as well, providing a second electrode in a semi-embedded manner to expose it, and inside the polymer wall, electrically connecting the first electrode and the second electrode (Patent Literature 4). The first electrode and the second electrode are formed of a fabric knitted with a metallic wire.

CITATION LIST

Patent Literatures

[Patent Literature 1]
Japanese Unexamined Patent Application Publication No. 2000-221

[Patent Literature 2]
Japanese Unexamined Patent Application Publication No. 2012-177210

[Patent Literature 3]
Japanese Unexamined Patent Application Publication No. 04-248209

[Patent Literature 4]
Japanese Unexamined Patent Application Publication No. 2006-524747

SUMMARY OF INVENTION

Technical Problem

In the sheet in Patent Literature 1, when using the metallic yarn such as a gold, silver, or copper yarn for the conductive part, or using the conducting yarn as the warp at the time of weaving, a feel of stiffness is strongly exhibited to make it difficult to enhance flexibility. Also, when using the sheet so as to stretch it, the metallic yarn is repeatedly plastically deformed, causing concern that the risk of disconnection increases. In addition, since restorability against elongation is low, a use period when stretchability is available is limited, and as an application where stretchability is expected, an inappropriate aspect is included.

On the other hand, in the fabric in Patent Literature 2, the stretchable transmission line is considerably thick as a whole because even the copper collective wire is estimated to be comparative to approximately 1 to 2 mm in diameter equivalent, and in addition, the braid having a diameter of 1.8 mm serving as a core and further the double (two-layered) coating layer formed of the false-twist textured yarn are also required. For this reason, even when the fabric is one suppressing disconnection due to stretching, it must be said that high stretchability, high flexibility, restorability against elongation, and the like cannot be expected at all.

As described, it can be said that any of the sheet in Patent Literature 1 and the fabric in Patent Literature 2 did not focus on a fabric that despite having high stretchability and flexibility as well as restorability at the time of repeated stretching, has the characteristics that between elongation and non-elongation, a change in electrical resistance is zero or suppressed. In addition, in a case such as when providing wiring among multiple boards, and wiring paths have complicated curves because of the arrangement of each board, wiring lengths or wiring paths are not fixed before a wiring stage, or the boards are mutually moved after the wiring, it is not suitable to use the sheet in Patent Literature 1 or the fabric in Patent Literature 2 as a wiring member.

In the conventional wiring material (Patent Literature 3), since both of the front and back sides of the conductive wires are coated with the insulating materials in a sandwiched manner, it is necessary to remove an insulating material on one surface to expose the conductive wires in multiple predetermined wiring positions distance in the longer direction of the conductive wires. Accordingly, when using the wiring material, wiring (electrical connection) in the predetermined wiring positions is fixed, and wiring in other positions is impossible or it is necessary to remove the insulating material in each case. As described, this wiring material is conditioned to specify a use place in order to set the predetermined wiring positions, and has problems such as, in addition to the problem of no degree of freedom of wiring position, the problem that production cost is high cost.

On the other hand, in the conventional bipolar plate (Patent Literature 4), since the first and second electrodes exposed on both of the front and back surfaces of the polymer wall are electrically connected, in a case such as when stacking multiple bipolar plates, when the bipolar plate contacts with another conductive material, or when using the bipolar plate while bending it, a disadvantageous short circuit may occur. For this reason, it is not suitable to use the bipolar plate for wiring, and when forcibly using it, there is the problem of many restrictions on a use place, a use situation, and the like.

In addition, the wiring material or the bipolar plate has not included the idea of actively inducing bendability and stretchability. For this reason, it is not suitable in a case such as when providing wiring among multiple boards, and wiring paths have complicated curves because of the arrangement of each board, wiring lengths or wiring paths are not fixed before a wiring stage, or the boards are mutually moved after the wiring.

The present invention is made in consideration of the above situations seen in Patent Literatures 1 and 2 and the like, and a first object thereof is to provide a conductive stretchable knitted fabric that despite having high stretchability and flexibility as well as restorability at the time of repeated stretching, has the characteristics that between elongation and non-elongation, a change in electrical resistance is zero or suppressed, and a harness for conduction.

The present invention is made in consideration of the above situations seen in Patent Literatures 3 and 4 and the like, and a second object thereof is to provide a solder-resistant conductive harness that despite having high flexibility against a bend or a twist, can prevent the occurrence of a disadvantageous short circuit, and that can be soldered in an arbitrary position and as necessary further configured to be provided with stretchability as well.

Solution to Problem

In order to accomplish the first object, the present invention takes the following means.

That is, the conductive stretchable knitted fabric according to the present invention is a knitted fabric that is knitted using a conductive yarn and a non-conductive elastic yarn simultaneously in accordance with a simultaneous use method other than a method for covering the elastic yarn with the conductive yarn, in which at least the conductive yarn is provided in a zigzag arrangement in a front-back direction in the knitted fabric, and the elastic yarn is provided in an arrangement that generates a tightening force along a surface direction parallel to the front and back surfaces of the knitted fabric to keep the shape of the zigzag arrangement of the conductive yarn.

A configuration in which the same course in the knitted fabric is separated into a constituent path knitted with the conductive yarn and a constituent path knitted with the elastic yarn, and the constituent paths can mutually independently exhibit stretching behaviors can also be employed.

The conductive yarn and the elastic yarn may be knitted at different knitting points, and thereby formed to have mutually independent knitted structures while having different loops, respectively.

The conductive yarn can be formed as a composite yarn by any of twisting together with a synthetic fiber or an elastic yarn, a covering process using a synthetic fiber or an elastic yarn, and paralleling together with a synthetic fiber or an elastic yarn.

The knitted fabric can be knitted so as to have any knitted structure among a smooth-knitted structure, a rib-knitted structure, and modified structures of them.

On the other hand, the harness for conduction according to the present invention includes a conductive part knitted using a conductive yarn and an elastic yarn simultaneously and a non-conductive part knitted using only a non-conductive yarn, in which: the conductive part is such that at least the conductive yarn is provided in a zigzag arrangement in a front-back direction in a knitted fabric and the elastic yarn is provided in an arrangement that generates a tightening force along a surface direction parallel to the front and back surfaces of the knitted fabric to keep the shape of the zigzag arrangement of the conductive yarn; the conductive part includes a constituent path employing a metallic wire as the conductive yarn; and the non-conductive part includes a constituent path employing a synthetic fiber as the non-conductive yarn.

The non-conductive part can also be one knitted including an aramid fiber.

In order to accomplish the second object, the present invention takes the following means.

That is, the solder-resistant conductive harness according to the present invention includes a conductive part and insulating parts that are provided in an arrangement sandwiching the conductive part from both sides, in which the conductive part is formed to have a woven/knitted structure by a coated conductive yarn prepared by coating a conductive yarn with a non-conductive coating material that can be melted at the melting temperature of solder, and the insulating parts are formed to have a woven/knitted structure not permeated with molten solder by a non-conductive yarn having heat resistance to the melting temperature of the solder.

The conductive part is formed long in a belt-like shape; the insulating parts are provided in both side parts along a belt longer direction of the conductive part; and the coated conductive yarn forming the conductive part and the non-conductive yarn forming the insulating parts can be both knitted with the belt longer direction of the conductive part as a course direction in which loops are connected.

The connecting parts between the conductive part and the insulating parts may be ones integrated by, during knitting, switching a yarn to be fed between the coated conductive yarn forming the conductive part and the non-conductive yarn forming the insulating parts.

The insulating parts arranged in both side parts of the conductive part can be ones inserted with an elastic yarn generating a tightening force in the course direction.

Advantageous Effects of Invention

The conductive stretchable knitted fabric and the harness for conduction according to the present invention have the characteristics that a change in electrical resistance is zero or suppressed between elongation and non-elongation even though they have high stretchability and flexibility as well as restorability at the time of repeated elongation.

The solder-resistant conductive harness according to the present invention can prevent the occurrence of a disadvantageous short circuit even though it has high flexibility against a bend or a twist, can be soldered in an arbitrary position, and further can also be configured to be provided with stretchability as necessary.

DESCRIPTION OF EMBODIMENTS

In the following, embodiments of the present invention will be described on the basis of the drawings.

Figure 1A:
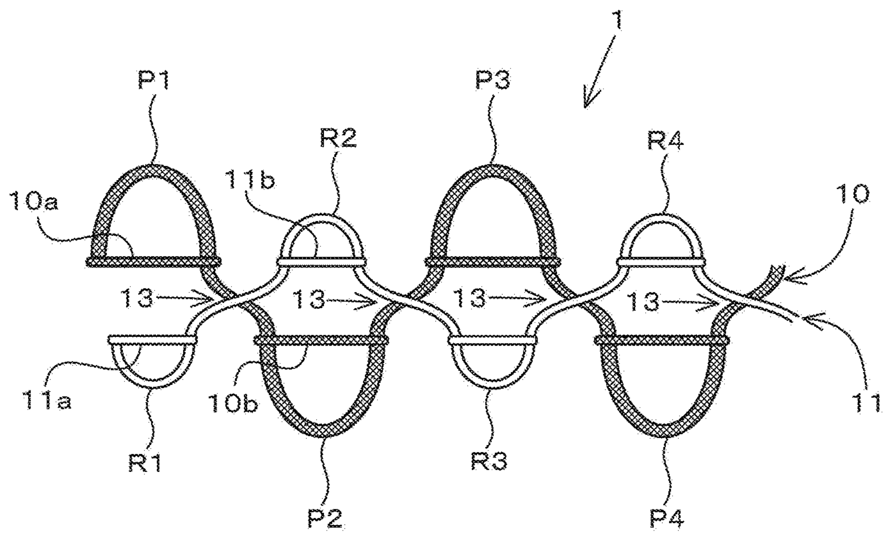
FIG. 1A is a cross-sectional double-sided stitch diagram illustrating a non-elongation state of a first embodiment of the conductive stretchable knitted fabric according to the present invention configured by smooth knitting.
Figure 1B:
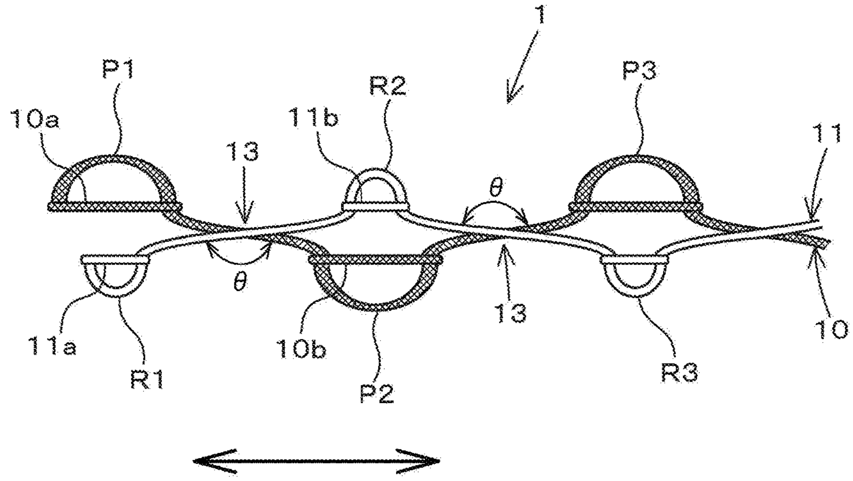
FIG. 1B is a cross-sectional double-sided stitch diagram illustrating an elongation state of the first embodiment of the conductive stretchable knitted fabric according to the present invention configured by the smooth knitting.

FIG. 1A is a double-sided stitch diagram illustrating anon-elongation state of a first embodiment of a conductive stretchable knitted fabric 1 according to the present invention, and FIG. 1B is a double-sided stitch diagram illustrating an elongation state of the first embodiment of the conductive stretchable knitted fabric 1 according to the present invention. When producing a harness for conduction 2, for example, as illustrated in FIG. 2, the conductive stretchable knitted fabric 1 can be used as one of the components of it.

Figure 2:
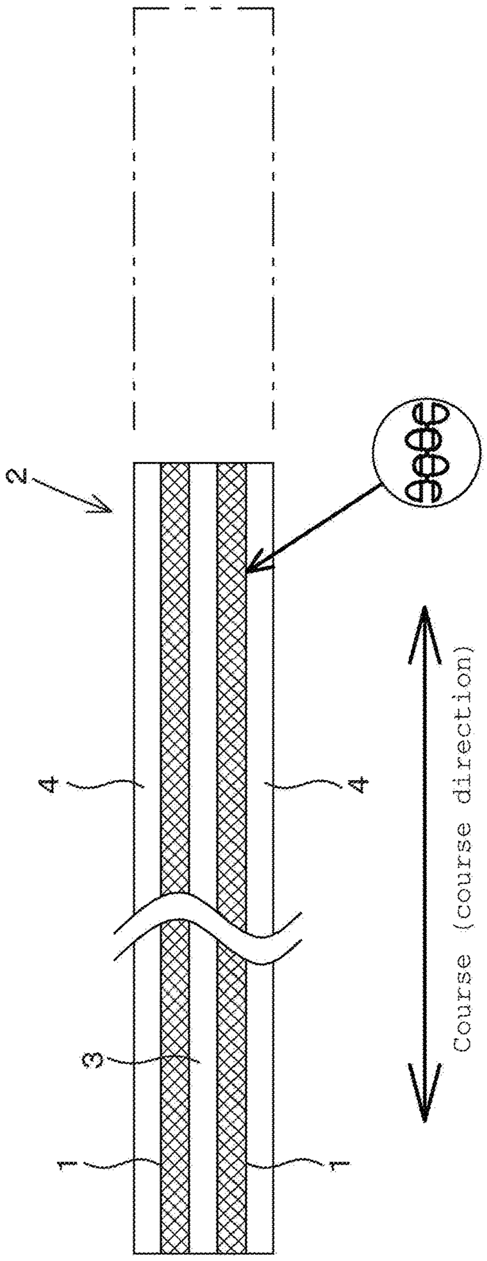
FIG. 2 is a plan view illustrating a harness for conduction configured using the conductive stretchable knitted fabric according to the present invention.

The harness 2 illustrated in FIG. 2 is one that is formed in a flat and long belt-like shape, and includes two conductive parts parallel to each other along a belt longer direction. These two conductive parts are formed of the conductive stretchable knitted fabric 1 according to the present invention (hereinafter referred to as a "present invention knitted fabric 1").

In the example illustrated in FIG. 2, the present invention knitted fabric 1 is formed in the long belt-like shape and in a state of being exposed on the front and back surfaces of the harness 2, and between the two present invention knitted fabrics 1, 1, a non-conductive part 3 for preventing a mutual short circuit is provided.

In addition, on the outer sides of these present invention knitted fabrics 1, 1 in a belt width direction, non-conductive parts 4 are also provided, and it is adapted to, when a side edge part of the harness 2 contacts with another object, prevent the occurrence of a short circuit, an electric leak, and/or the like due to a present invention knitted fabric 1. The non-conductive parts 3, 4 are all composed as knitted fabrics knitted using only a non-conductive yarn such as a synthetic fiber (e.g., an aramid fiber), a natural fiber, or a material in which a synthetic fiber and an elastic yarn are used simultaneously, and as with the present invention knitted fabric 1, formed in a state of being exposed on the front and back surfaces of the harness 2.

Note that regarding the present invention knitted fabric 1, three or more may be provided in the belt width direction of the harness 2 and separated by non-conductive parts 3 or only one may be provided in the middle in the belt width direction of the harness 2. Also, a non-conductive part 4 may be provided only on one side of a present invention knitted fabric 1 or may not be provided.

In addition, the present invention knitted fabric 1 is not formed in the belt-like shape but can also be formed in a line shape, or also formed as a wide width one forming the harness 2 wholly in the belt width direction and in the belt longer direction (these will be described later). In short, the arrangement of the present invention knitted fabric 1 and the number of present invention knitted fabrics to be formed are not limited at all. Further, the harness 2 itself is also not limited to being formed in the belt-like shape at all, but can also be formed in a quadrangular shape such as a square shape or a rectangular shape.

In the harness 2 illustrated in FIG. 2, a present invention knitted fabric 1 (the two conductive parts) is adapted to have a conduction property exhibiting low electrical resistance between both end parts in the belt longer direction. Besides, even at an arbitrary position in the belt longer direction, on the belt front surface and/or the belt back surface, it is adapted to have a conduction property exhibiting low electrical resistance. Accordingly, it is only necessary to employ a use method such as setting the magnitude of electrical resistance depending on the distance between two points to be electrically connected in the belt longer direction of the present invention knitted fabric 1, or conversely setting length corresponding to electrical resistance. Alternatively, even by selecting whether to increase the belt width (the number of courses) of the present invention knitted fabric 1 or decrease the width, the magnitude of electrical resistance can be set.

Further, the harness 2 has high stretchability along the belt longer direction with the present invention knitted fabrics 1 and the non-conductive parts 3, 4 integrated, as well as high flexibility enough to freely respond to a warp and a bend toward the front/back direction, left and right bends along the surface direction, further a twist, and the like. In addition, the harness 2 has the characteristics that, even when stretched in the belt longer direction, warped or bent it in the front/back direction, bent along the surface direction, or further repeatedly subjected to such stretching, warping, or bending, electrical resistance is kept in an unchanged state.

"Low electrical resistance" herein refers to having a resistance value by which a voltage drop occurring when applying current does not affect any function. A specific resistance value is variously different depending on an application or a use condition. For example, for power feeding, it is 10 Ω/m or less, preferably 1 Ω/m or less, or further desirably 0.1 Ω/m or less; however, an allowable range is different depending on wiring length or supply current.

In general, as compared with the power feeding purpose, for a signal, current is typically low, and therefore a higher resistance value is allowable.

On the other hand, "stretchability" refers to a property having both elongation from a non-elongation state (an original state) and immediate restoration due to release from the elongation state. Whether or not stretchability is set to the same strength or made different in strength between the present invention knitted fabrics 1 and the non-conductive parts 3, 4 can be appropriately changed. For example, with a goal of making wrinkles, flapping, and/or the like inconspicuous as the whole of the knitted fabric, or suppressing stretchability so as to prevent a conductive yarn 10 from being damaged when placing an elongation load, corresponding stretchability only has to be set.

The degree of elongation from the non-elongation state (an elongation degree) can be handled by, as desired, appropriately changing various factors such as the material and thickness of a component (yarn) used for knitting, whether or not knitting components are used simultaneously, methods for using the knitting components simultaneously (such as covering, plating, and paralleling), the number of components to be used simultaneously, the belt width, belt length, and the like of the harness 2.

Also, it goes without saying that the elongation degree can also be appropriately changed by selecting component structure. In this case, in particular, when designing knitting of the present invention knitted fabrics 1, adjustment among the loop length of the conductive yarn 10, the elastic modulus of an elastic yarn 11, and drafting (elongating a short fiber bundle to narrow it) is a big factor.

In addition, regarding the restoration, 100% restoration to length at the time of non-elongation is ideal. However, the 100% restoration is not necessarily limited, and it is only necessary to set performance suitable for an application, such as to prescribe the number of repetitions of elongation and restoration, and then in the case of the prescribed number of times or less, regard one having characteristics exhibiting at least 80% restoration as "good". When "the number of elongation-restoration repetitions" is less than 1000, it must be said to be substantially unsuitable for practical use.

"The number of elongation-restoration repetitions" can be counted by a repeated tensile fatigue test using a De Mattia repeated fatigue tester. In this case, as a test piece as the harness 2, a rectangular one with alongside in a course direction is used. In the present embodiment, the dimensions of the test piece were set such that the long side was 10 cm long and the short side 1 was 1.5 cm long. Also, in the test piece, for the non-conductive parts 3, 4 correspondingly sandwiching both sides of the conductive parts (the present invention knitted fabrics 1), a 40's cotton yarn was used, and this allowed consideration to be made not to give the effect of elongation (disturbance) to the conductive parts.

The test piece was marked at intervals of 5 cm in the non-elongation state. In addition, a stroke (the elongation degree) was adjusted as a criterion that the marking interval was elongated to 10 cm in the elongation state. The test was performed at room temperature, in which elongation and restoration were repeated 3000 times and 10000 times at a rate of 60 times/minute, and by measuring the marking interval and a resistance value between markings to confirm that a prescribed result was obtained, the numbers of repetitions were regarded as achievement.

The harness 2 as described can be produced by employing, for example, a method described in Japanese Unexamined Patent Application Publication No. 11-279937 (a method for taking tape fabric out of cylindrical fabric) or the like. That is, this is a method that takes out the harness 2 while spirally separating it by, when knitting the cylindrical fabric using a circular knitting machine, performing piece knitting that is simultaneous knitting from multiple feeders on a total of five sections, i.e., a non-conductive part 4 on an outer side in the belt width direction, a present invention knitted fabric 1, the non-conductive part 3 in the center in the belt width direction, a present invention knitted fabric 1, and a non-conductive part 4 on an outer side in the belt width direction, inserting connecting yarns dissolvable by heat, water, a solvent, or the like between pieces, and performing a process of dissolving the connecting yarns from the resulting cylindrical fabric after the knitting.

When knitting the present invention knitted fabric 1, as illustrated in FIG. 1A and FIG. 1B, the conductive yarn 10 and the elastic yarn 11 are used simultaneously. As long as the conductive yarn 10 and the elastic yarn 11 are included, using another type of yarn simultaneously is arbitrary.

Knitted structure employable for the present invention knitted fabric 1 is assumed to be, for example, that of smooth knitting (also referred to as double-sided knitting or interlock knitting). The smooth knitting has a knitted structure in which two rib-knitted fabrics are mutually superposed with mutual convex and concave grooves fitted. That is, to describe this with the upper surface side in FIG. 1A as a knitted fabric front surface side and the lower surface side in FIG. 1A as a knitted fabric back surface side, the conductive yarn 10 is entangled with a conductive yarn old loop 10*a* on the knitted fabric front surface side to form a first loop P1 and shifts to the knitted fabric back surface side. Then, it is entangled with a conductive yarn old loop 10*b* on the knitted fabric back surface side to form a second loop P2, and after that, a process like the formation of a third loop P3 on the knitted fabric front surface side and the formation of a fourth loop P4 on the knitted fabric back surface side are repeated in the same manner. Accordingly, the conductive yarn 10 is provided in a zigzag arrangement in the front-back direction in the knitted fabric of the present invention knitted fabric 1.

On the other hand, the elastic yarn 11 is entangled with an elastic yarn old loop 11*a* on the knitted fabric back surface side to form a first loop R1, and shifts to the knitted fabric front surface side. Then, it is entangled with an elastic yarn old loop 11*b* on the knitted fabric front surface side to form a second loop R2, and after that, a process like the formation of a third loop R3 on the knitted fabric back surface side and the formation of a fourth loop R4 on the knitted fabric front surface side are repeated in the same manner. Accordingly, the elastic yarn 11 is also provided in a zigzag arrangement in the front-back directions in the knitted fabric of the present invention knitted fabric 1. As a result, in the knitted fabric, a crossing part 13 between the conductive yarn 10 and the elastic yarn 11 is formed in an alternate arrangement on a loop basis.

Note that the elastic yarn 11 has high stretchability, whereas the conductive yarn 10 hardly stretches. For this reason, when elongating the present invention knitted fabric 1 along a surface direction parallel to the front and back surfaces thereof (a left-right direction in FIG. 1A and the same as the below-described "course direction"), a crossing angle θ appearing on the front and back surface sides of the knitted fabric because the elastic yarn 11 and the conductive yarn 10 crosses at the crossing parts 13 is gradually increased, and after the situation of becoming an obtuse angle, only the elastic yarn 11 gradually elongates well.

Subsequently, the conductive yarn 10 behaves so as to be drawn from its loops toward the crossing parts 13 while being pulled by the elongation of the elastic yarn 11.

Also, when releasing the elongation of the present invention knitted fabric 1, only the elastic yarn 11 generates a tightening force due to contraction at the crossing parts 13, and upon receipt of the tightening force, the conductive yarn 10 behaves so as to be pushed into loops on both outer sides of the crossing parts 13. The tightening force by the elastic yarn 11 at the time produces the action of keeping the shape of the zigzag arrangement of the conductive yarn 10 to keep volume in the thickness direction in the present invention knitted fabric 1 in the non-elongation state.

As described, even though the conductive yarn 10 only decreases or increases the loops by being drawn from the loops or pushed from the crossing parts 13, the conductive yarn 10 behaves as if it elongates or contracts along with the stretching of the elastic yarn 11, and consequently, the present invention knitted fabric 1 is adapted to be one having stretchability as illustrated in FIG. 1B.

As is clear from the description above, since the conductive yarn 10 does not substantially stretch, the total length used in the course direction does not change, and the outside diameter thereof does not of course also change. In addition, in the conductive yarn 10, the loops arrayed in the course direction does not contact with each other, and conductive yarns 10 do not get entangled or contact between multiple courses. Accordingly, electrical resistance also does not change.

In addition, it can be said that in the present invention knitted fabric 1, one and the same course in the knitted fabric is separated into a constituent path knitted with the conductive yarn 10 and a constituent path knitted with the elastic yarn 11. For this reason, the effect (interference) of stretching behaviors through the constituent paths on each other is suppressed to make them independent of each other, and therefore through each constituent path, stretching behavior having a high degree of freedom is allowed. This allows high stretchability and flexibility to be ensured as the present invention knitted fabric 1.

In addition, in a knitted fabric configuration adapted to separate the constituent path of the conductive yarn 10 and the constituent path of the elastic yarn 11 as described, in the constituent path of the conductive yarn 10, many conductive yarns 10 can be inserted per path. For this reason, the electrical resistance value of the present invention knitted fabric 1 can be set as low as possible. In the case of the elastic yarn 11 as well, it is the same that many elastic yarns 11 can be inserted per path. Arranging many elastic yarns 11 results in the advantage of being able to improve an elastic property.

As a method for obtaining the knitted fabric configuration adapted to separate the constituent path of the conductive yarn 10 and the constituent path of the elastic yarn 11, a method that when knitting the present invention knitted fabric 1, knit the conductive yarn 10 and the elastic yarn 11 at different knitting points to form respective different loops can be shown.

Note that the "course direction" refers to a direction to advance while forming loops connected in the knitted structure, and is defined as the same direction as the "course". A direction orthogonally intersecting with the course direction on the knitted fabric surface is defined as a "wale" or a "wale direction". Also, "between courses" refers to between courses adjacent in the wale direction.

It is clear from the above that in the present invention knitted fabric 1, conductivity in the course direction is exhibited by the conductive yarn 10 of one course (as a line of continuous conductive yarn 10). In addition, in order to decrease an electrical resistance value of one course, it is only necessary to increase the number of conductive yarns 10 by an S twist, Z twist, paralleling, plating, or the like, select a material having low electrical resistance, or increase thickness.

Also, in order to further enhance stretchability, there is also a method of using a thick polyurethane yarn or a polyurethane yarn having high elastic modulus resulting in a high restoration force (kickback) against elongation with a draft increased (loop length decreased). Further, there are also methods such as secondarily feeding a relatively narrow elastic yarn 11 (polyurethane or the like) through the path of the conductive yarn 10 together and using a covering yarn (one using the elastic yarn 11 such as a polyurethane yarn as a "core" and the conductive yarn 10 as a "cover"). Note that these methods only play a secondary role for the stretching behavior.

As the conductive yarn 10, a metallic wire formed of a pure metal such as aluminum, nickel, copper, titanium, magnesium, tin, zinc, iron, silver, gold, platinum, vanadium, molybdenum, tungsten, or cobalt, any of alloys of them, stainless steel, brass, or the like can be used. In some cases, in place of the metallic wire, a carbon fiber can also be employed. The diameter of the wire is preferably 10 to 200 μm. In particular, it is desirable to use a bundle of small-diameter fibers. Regarding the metallic wire, whether or not it is easily plastically deformed, whether or not it has a remarkable elastic restoration force (a spring force), or the like is not particularly limited.

In addition, as the conductive yarn 10, one covered with a resin fiber (nylon, polyester, polyurethane, fluororesin, or the like) can also be used. In doing so, the present invention knitted fabric 1 can be provided with functions as hydrophilicity, water repellency, corrosion resistance, anticorrosion, coloring, and the like. Also, the conductive yarn 10 can be such that the resin fiber or the metallic wire is applied with surface treatment such as wet or dry coating or plating, or deposited with an organic or inorganic thin film by vacuum deposition.

Further, the conductive yarn 10 can also be formed as a composite yarn by twisting, covering processing, or paralleling together with the elastic yarn 11.

For the elastic yarn 11, polyurethane or a rubber-based elastomer material can be used, or a covering yarn using polyurethane or an elastomer material as the "core" and nylon or polyester as the "cover", or the like can be employed.

Note that it is recommended to select a material for the elastic yarn 11 such that it does not exhibit elongation exceeding an elongation degree corresponding to the tensile strength limit of the conductive yarn 10 (in order to restrict the elongation of the conductive yarn 10). When employing the covering yarn for the elastic yarn 11, it is also possible to select a material that provides the "cover" with an elongation restriction action on the conductive yarn 10. A material for the elastic yarn 11 itself or for the "cover" may be selected for the purpose of being adapted to elongation behavior required for the present invention knitted fabric 1. In addition, in order to restrict the elongation of (a load on) the conductive yarn 10, the non-conductive parts 3, 4 may perform control.

For example, when requiring powerful behavior exhibiting rapid restoration (return) from elongation, a relatively thick elastic yarn 11 having ferroelasticity is selected. On the other hand, when requiring slow behavior exhibiting gradual restoration from elongation, a relatively narrow elastic yarn 11 having weak elasticity is selected.

As is clear from the above detailed description, even though the present invention knitted fabric 1 is a knitted fabric having high stretchability and flexibility as well as restoration at the time of repeated elongation, it has the characteristics that between elongation and non-elongation, a change in electrical resistance is zero or suppressed. For this reason, in a case such as when providing wiring among multiple boards, and wiring paths have complicated curves because of the arrangement of each board, wiring lengths or wiring paths are not fixed before a wiring stage, the boards are mutually moved after the wiring, or the action of a moving body causes large repeated stretching variations in wiring lengths under a situation where between the boards and the moving body, wiring is provided, it is also possible to make use as a preferred wiring member.

In addition, since the electrical resistance is unchanged between elongation and non-elongation, it is possible to preferably make use as a signal line avoiding disturbance as well.

The present invention knitted fabric 1 is one that makes the conductive yarn 10 behave between the elongation state and non-elongation state of the knitted fabric by providing the tightening force (contraction force) in the surface direction due to the elastic yarn 11. Accordingly, in the present invention knitted fabric 1, the point that despite exhibiting high stretchability (e.g., 200% or more), a metallic wire can be used as the conductive yarn 10 is one of characteristic points.

When using a metallic wire as the conductive yarn 10 as described, as compared with a plated yarn or the like, electrical resistance can be suppressed much low, and it is also suitable to increase a feedable voltage value or current value without increasing the thickness of the knitted fabric (it is possible to make the knitted fabric thin). In addition, there is an advantage of being able to enhance the durability of the conductive parts and thus the durability of the present invention knitted fabric 1. Further, it is possible to enhance designability and at the same time widely expand development in terms of appearance.

Figure 3:
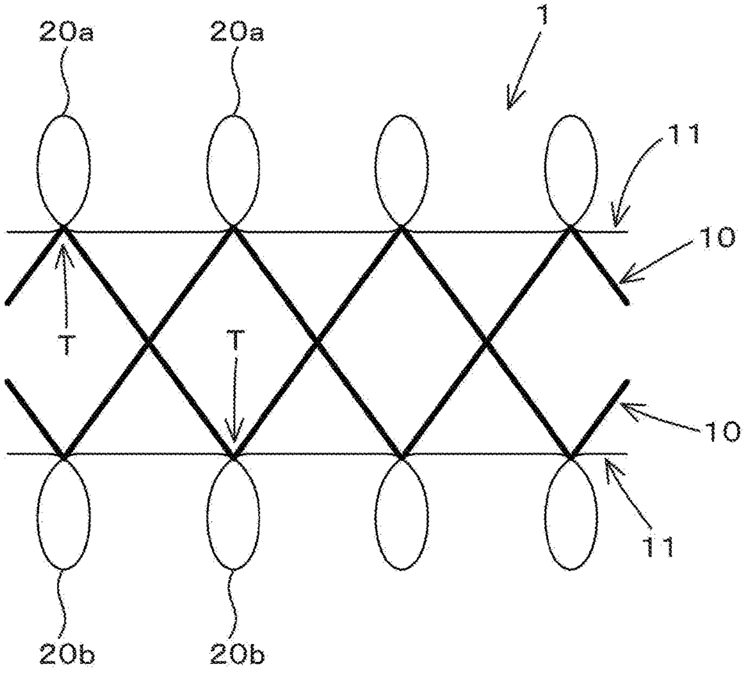
FIG. 3 is a structural diagram illustrating a second embodiment of the conductive stretchable knitted fabric according to the present invention configured by double knitting.

FIG. 3 is a structural diagram illustrating a second embodiment of the conductive stretchable knitted fabric according to the present invention. In the present third embodiment employs a double-knitted structure as a knitted structure. The double-knitted structure is a knitted structure in which plain-knitted fabrics on front and back sides are mutually superposed, and tucks (arrows T) connect between them. That is, to describe this with the upper side in FIG. 3 as a knitted fabric front surface side and the lower surface side in FIG. 3 as a knitted fabric back surface side, a conductive yarn 10 repeats being tucked with a plain-knitted loop 20*a* on the knitted fabric front surface side, then shifting to the knitted fabric back surface side, and being tucked with a plain-knitted loop 20*b* on the knitted fabric back surface side, and is provided in a zigzag arrangement in the front-back direction in a knitted fabric of the present invention knitted fabric 1.

On the other hand, elastic yarns 11 are knitted into plain-knitted fabrics on the knitted fabric front surface side and on the knitted fabric back surface side. Accordingly, tightening forces (contraction forces) generated by the elastic yarns 11 along a surface direction parallel to the front and back surfaces produce the action of keeping the shape of the zigzag arrangement of the conductive yarns 10 in the present invention knitted fabric 1 in a non-elongation state to keep volume in the thickness direction. The other configurations and working effects are substantially the same as those of the first embodiment.

Figure 4:
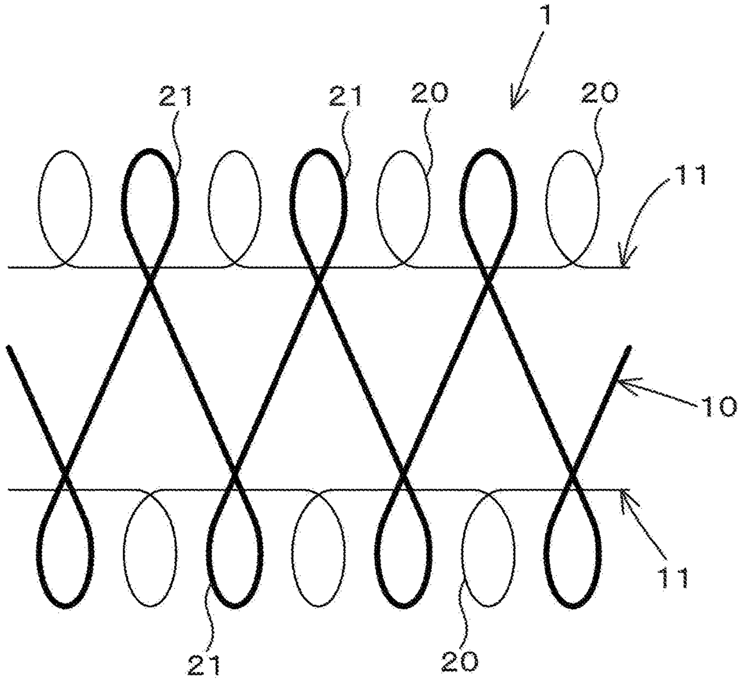
FIG. 4 is a structural diagram illustrating a third embodiment of the conductive stretchable knitted fabric according to the present invention.

FIG. 4 is a structural diagram illustrating a third embodiment of the conductive stretchable knitted fabric according to the present invention. The third embodiment also shows a knitted structure in which plain-knitted fabrics on front and back sides are mutually superposed, and connections between them are made, and a conductive yarn 10 is provided in a zigzag arrangement in the front-back direction between a knitted fabric front surface side and a knitted fabric back surface side.

The difference from the second embodiment is that a path formed by the conductive yarn 10 in a zigzag shape in the front-back direction of the knitted fabric and paths formed by elastic yarns 11 so as to cause tightening forces along the surface direction of the knitted fabric are entangled, and the conductive yarn 10 and the elastic yarns 11 are held mutually movably (in a state where stretching actions are freely allowed) in a contraction state. FIG. 4 illustrates the cross-sectional structure of the knitted fabric, in which in practice, loops 21 of the conductive yarn 10 and loops 20 of the elastic yarns 11 respectively form protruded rims that are correspondingly connected in a ridge like manner on the front surface and back surface of the knitted fabric. For this reason, any of the loops never falls out toward the thickness center of the knitted fabric (this is explained as the "entanglement" of the mutual paths).

The other configurations and working effects are the same as those of the first embodiment.

EXAMPLES

In the following, examples of the present invention knitted fabric 1 will be exemplified; however, these are ones disclosed in order to facilitate technical understanding, and the technical scope of the present invention is not limited to the following exemplifications.

Example 1

Smooth knitting (see FIG. 1A and FIG. 1B) was performed using four copper wires having a wire diameter of 50 μm as the conductive yarn 10 and a 235 dt polyurethane yarn as the elastic yarn 11.

Example 2

Smooth knitting (see FIG. 1A and FIG. 1B) was performed using one nickel wire having a wire diameter of 40 μm as the conductive yarn 10 and a 235 dt polyurethane yarn as the elastic yarn 11. A nickel wire has high weather resistance, and therefore can be said to be one particularly suitable when used for a part where an environment is regarded as important.

Example 3

Smooth knitting (see FIG. 1A and FIG. 1B) was performed using a composite yarn formed of three copper wires having a wire diameter of 50 μm and a 110 dt polyurethane yarn as the conductive yarn 10 and 235 dt polyurethane for the elastic yarn 11.

Example 4

Double knitting (see FIG. 3) was performed using three copper wires having a wire diameter of 50 μm as the conductive yarn 10 and a 235 dt polyurethane yarn as the elastic yarn 11.

Example 5

Figure 6:
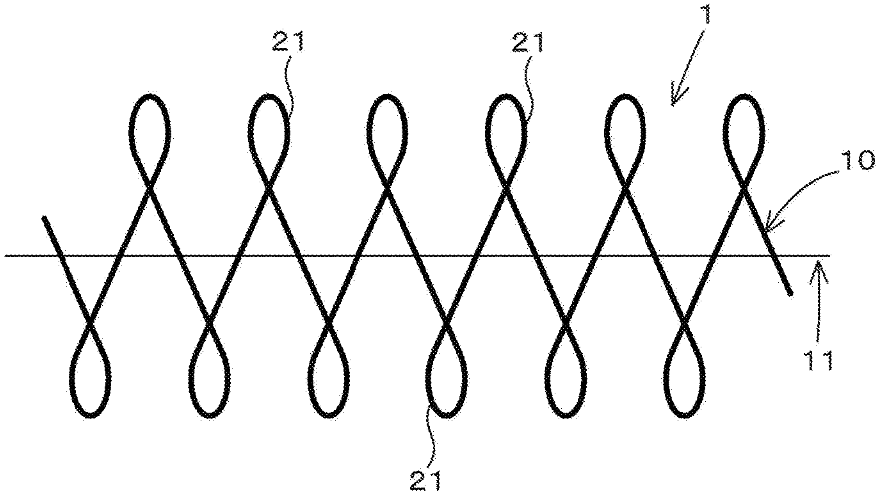
FIG. 6 is a structural diagram of an embodiment of the conductive stretchable knitted fabric according to the present invention configured by fraise inlay knitting.

Inlay was performed using three copper wires having a wire diameter of 50 μm as the conductive yarn 10 and a 235 dt polyurethane yarn as the elastic yarn 11, and fraise inlay knitting was performed (see FIG. 6).

Example 6

Fraise knitting (rib knitting) was performed using plating knitting with three copper wires having a wire diameter of 50 μm and a 110 dt polyurethane yarn as the conductive yarn 10. A knitted structure based on the fraise has sufficient volume in terms of knitted fabric thickness, and therefore it can be expected that the polyurethane yarn inserted by the plating knitting acts as the elastic yarn 11.

Comparative Example

Single knitting (plain knitting) is performed using plating knitting with three copper wires having a wire diameter of 50 μm and a 110 dt polyurethane yarn as the conductive yarn 10. A knitted structure based on the single knitting has insufficient volume in terms of knitted fabric thickness, and therefore it cannot be expected that the polyurethane yarn inserted by the plating knitting acts as the elastic yarn 11. That is, it can be said that this comparative example is one not employing the elastic yarn 11.

reason, it can be said that regarding the maximum elongations listed in Table 1, one having a large numerical value is preferable depending on the setting of the amplitude.

On the other hand, the harness 2 (one having the configuration illustrated in FIG. 2) according to the present invention was produced as follows using the present invention knitted fabric 1 having a smooth structure (see FIG. 1A and FIG. 1B) for the conduction parts.

In addition, the non-conductive part 3 in the center in the belt width direction and the non-conductive parts 4 on the outer sides in the belt width direction were adapted to have the same number of courses and the same use material. Also, two coating courses formed of adhesive polyurethane were provided so as to fringe each of both side edge parts in the belt width direction, thus improving handleability.

TABLE 1

| | | | Example 1 | Example 2 | Example 3 | Example 4 | Example 5 | Example 6 | Comparative example |
|---|---|---|---|---|---|---|---|---|---|
| Design | | Structure | Smooth | Smooth | Smooth | Double | Fraise Inlay | Fraise | Single |
| | | Knitted structure by conductive yarn | Cuϕ50μ × 4 | Niϕ40μ | Cuϕ50μ × 3 PU110dt | Cuϕ50μ × 3 | Cuϕ50μ × 3 | Cuϕ50μ × 3 PU235dt | Cuϕ50μ × 3 PU235dt |
| | | Knitted structure by elastic yarn | PU235dt | PU235dt | PU235dt | PU235dt | PU235dt | — | — |
| | | Number of courses | 10 | 10 | 10 | 10 | 10 | 10 | 10 |
| Performance | | Maximum elongation | 250% | 300% | 300% | 300% | 300% | 175% | 150% |
| | | Conductivity (Ω/5 cm) | 0.1 | 4.0 | 0.2 | 0.1 | 0.1 | 0.2 | 0.2 |
| Durability 100% elongation | 3000 times | Conductivity (Ω/5 cm) | 0.1 | 4.0 | 0.2 | 0.1 | 0.1 | 0.3 | 0.3 |
| | | Measurement on table | 5.1 | 5.0 | 5.0 | 5.0 | 5.0 | 5.5 | 5.6 |
| | 10000 times | Conductivity (Ω/5 cm) | 0.1 | 4.0 | 0.1 | 0.1 | 0.1 | 0.5 | — |
| | | Measurement on table | 5.2 | 5.1 | 5.0 | 5.0 | 5.0 | 5.8 | 5.9 |
| Kickback | | Sensory value | Strong | Strong | Strong | Strong | Strong | Weak | Weak |

* Elongation = (Length after elongation − Original length)/original length × 100%
* dt stands for dtex.

As listed in Table 1, it has been confirmed that in Examples 1 to 5, maximum elongations of 250 to 300% can be exhibited, and even when repeating stretching 10000 times to the maximum elongations, strong restoration forces durable enough for practical use are held. The fraise knitting (rib knitting) employed in Example 6 was one capable of achieving a durability of 3000 times as "the number of elongation-restoration repetitions" because the conductive yarn 10 in the resulting knitted fabric was a voluminous one in the front-back direction and had a configuration comparable to the zigzag arrangement. In this sense, it was one capable of obtaining the effects of the present invention.

In contrast, in Comparative Example, it has been clarified that since the single knitting (plain knitting) is employed, the maximum elongation is small and a restoration force is also small because the conductive yarn 10 in the resulting knitted fabric is not arranged in a zigzag shape in the front-back direction and also the knitted fabric is equivalent to not employing the elastic yarn 11, and therefore the knitted fabric is unsuitable for practical use.

Note that when repeatedly performing the stretching action, it is preferable to perform it with the amplitude of it set to approximately ½ of the maximum elongation in consideration of effect on the conductive yarn 10. For this Further, the conductive parts (the present invention knitted fabrics 1) are adapted to include constituent paths employing an enameled wire as the conductive yarn 10, and the non-conductive parts 4 are adapted to include constituent paths employing an aramid fiber as the non-conductive yarn.

TABLE 2

| | Conductive part | Non-conductive part | Edge part |
|---|---|---|---|
| Number of courses | 10 courses | 5 courses | 2 courses |
| Knitted structure by conductive yarn | Enameled wire Cuϕ50μ × 3 | Aramid 220 dt | Adhesive PU78 dt |
| Knitted structure formed by elastic yarn | PU235 dt | PU235 dt | Adhesive PU78 dt |

* dt stands for dtex.

The enameled wire used as the conductive yarn 10 in the conductive parts (the present invention knitted fabrics 1) is coated with resin, and therefore has the characteristics of ensuring insulation from the surroundings. Also, the aramid fiber used for the non-conductive parts 3, 4 is superior in heat resistance, and therefore can be resistant to the heat of soldering at the time of electrical wiring. For this reason, the problem that the soldering heat melts the non-conductive parts 3, 4 does not occur, and consequently the resin coating of the enameled wire as the conductive yarn 10 was well melted to enable reliable and easy soldering.

Meanwhile, the present invention is not limited to each of the above-described embodiments, but can be appropriately modified depending on an embodiment.

For example, the present invention knitted fabric 1 is not limited to being knitted as the cylindrical fabric, but may be knitted as a non-cylindrical sheet shape. Accordingly, it can be knitted by a general-purpose knitting machine such as a circular knitting machine or a flat knitting machine.

Figure 5:
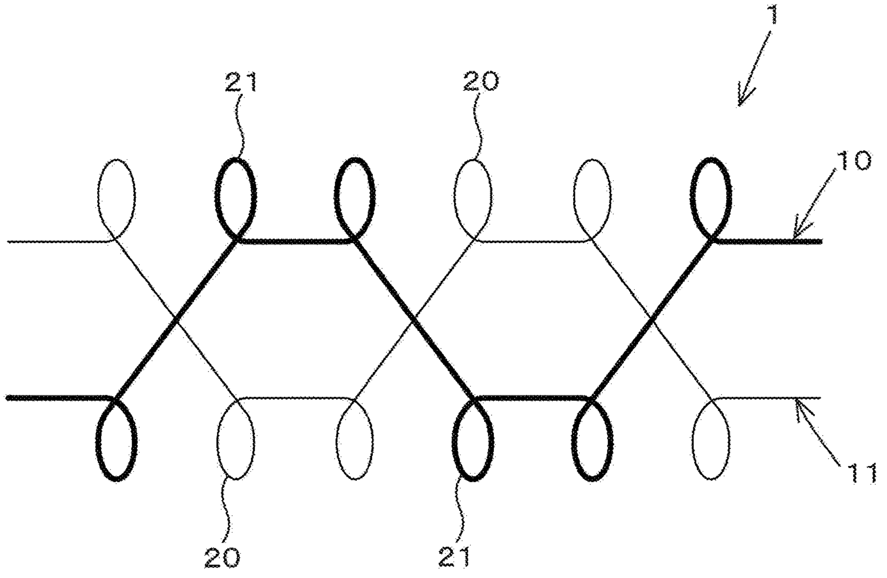
FIG. 5 is a structural diagram of an embodiment of the conductive stretchable knitted fabric according to the present invention configured by eight lock knitting.

The present invention knitted fabric 1 may be rib knitting in addition to the smooth knitting described with FIG. 1A and FIG. 1B, the double knitting described with FIG. 3, and knitting having the knitted structure described with FIG. 4, or can be knitted so as to have any knitted structure of modified structures of them. For example, eight lock as illustrated in FIG. 5, the fraise inlay as illustrated in FIG. 6, and in addition, although illustration is omitted, Milano rib, mock Milano rib, half cardigan, triple interlock, cordlane, cross tuck, and the like can be exemplified. Warp knitting can also be employed.

The present invention knitted fabric 1 has many applicable fields such as clothing (as a wearable material and the like) in addition to the above-described power feeding, signal, and medical applications.

In the present invention knitted fabric 1, it is necessary to adjacently provide at least two courses of the conductive yarn 10 in the wale direction; however, the extent to which the number of courses is increased is not limited at all. For this reason, the present invention knitted fabric 1 can also be formed in a line shape or in a wide belt shape. Accordingly, as the harness 2 as illustrated in FIG. 2, the present invention knitted fabric 1 can be formed throughout in the belt width direction and belt longer direction of the harness 2.

In addition, the present invention knitted fabric 1 can also be formed in a quadrangular shape such as a square shape or a rectangular shape. In this case, it can be employed as, for example, an electrode for sensing biological information to acquire it, or the like.

Besides, in addition to the conductive yarn 10 and the elastic yarn 11, a knitting yarn for restricting elongation (which is preferably a non-elastic yarn but may be a yarn adapted to restrict elongation by a twist or a knitted structure) can also be used simultaneously. It is preferable that the knitting yarn and knitting design of the non-conductive parts 3, 4 allow elongation to be restricted.

When separating one and the same course in the knitted fabric into the constituent path knitted with the conductive yarn 10 and the constituent path knitted with the elastic yarn 11, it is possible to make another non-conductive yarn material parallel to part or the whole of the conductive yarn 10 or make another conductive yarn material parallel to part or the whole of the elastic yarn 11.

Figure 7:
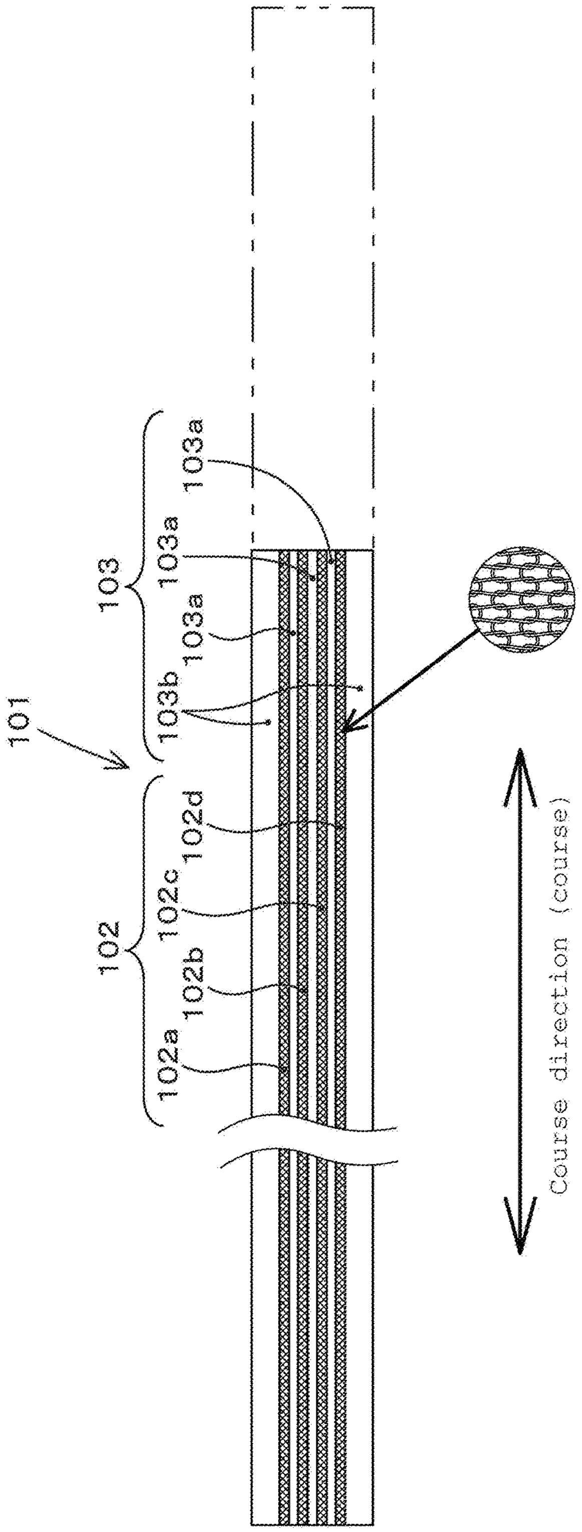
FIG. 7 is a plan view illustrating the solder-resistant conductive harness according to the present invention.

FIG. 7 is a plan view illustrating a solder-resistant conductive harness 101 (hereinafter simply referred to as a "harness 101") according to the present invention. This harness 101 is formed to have any of a woven structure, a knitted structure, a composite structure of them, and a combination of structures (hereinafter these are collectively referred to as a "woven/knitted structure"), and includes: a conductive part 102; and non-conductive insulating parts 103 provided in an arrangement sandwiching the conductive part 102 from both sides. In principle, the front and back surfaces of the conductive part 102 and the front and back surfaces of the insulating parts 103 respectively form the front and back surfaces of the harness 101 (or are exposed). However, there are exceptions as will be described later.

Also, the harness 101 is formed to have the woven/knitted structure, and thereby adapted to have high flexibility enough to freely respond to a warp and a bend in the front-back direction, and a left and right bends along the surface direction, and further various deformations such as a twist, which occur integrally in the conductive part 102 and the insulating parts 103. The harness 101 has the characteristics that the electrical resistance of the conductive part 102 is kept constant (the electrical resistance is unchanged) even when applied with such deformations or even when given behavior repeatedly exhibiting such deformations.

The harness 101 is such that the conductive part 102 itself has conductivity, but both surfaces, i.e., a front surface and a back surface as the harness 101 (including the front and back surfaces of the conductive part 102) is kept non-conductive. For this reason, even when the harness 101 contacts with another conductor, a disadvantageous short-circuit, electric leak, and/or the like through the front and/or back surfaces of the conductive part 102 do not occur.

However, the conductive part 102 is configured to be solderable. That is, it is possible to solder lead wires, connecting terminals, and/or electronic parts to the conductive part 102, and the harness 101 is one that can be used as a conductive member for such soldered members along the belt longer direction thereof. In addition, soldering to the conductive part 102 can be performed at any position, and the number of soldering positions is not limited at all.

The harness 101 of the present embodiment is adapted to be one formed in a flat belt-like shape, and in the center in the belt width direction, including multiple (in the illustrated example, four) conductive parts 102 that are long along the belt longer direction. In addition, it is adapted to be one including: insulating part 103 (there are three) arranged interposing between adjacent conductive parts 102; and insulating parts 103 (there are two) arranged on the outermost sides in the belt width direction.

In other words, since the individual conductive parts 102 are in a state of being separated by corresponding insulating parts 103, the harness 101 has the characteristics that when performing soldering at multiple positions (e.g., both end parts) of each conductive part 102 in the belt longer direction, the conductive part 102 is not erroneously identified (selected in terms of arrangement) and the soldering can be easily performed. In short, when performing soldering work, soldering positions (on a predetermined conductive part 102) can be prevented from being mistaken.

The harness 101 of the present embodiment is adapted to be one also having the characteristics that by forming both of the conductive parts 102 and the insulating parts 103 to have knitted structure, the conductive parts 102 and the insulating parts 103 are made integrally stretchable in the belt longer direction thereof. The harness 101 has the characteristics that even when stretched, the electrical resistance of a conductive part 102 is kept constant (the electrical resistance is unchanged).

In the following description, for convenience, the four conductive parts 102 may be distinctively referred to by respective symbols 102*a*, 102*b*, 102*c*, and 102*d* in their arrangement order. Also, the three insulating parts 103 interposing between adjacent conductive parts 102 may be tentatively referred to as "intermediate insulating parts 103*a*" and the two insulating parts 103 arranged on the outermost sides in the belt width direction may be tentatively referred to as "outer insulating parts 103*b*".

Note that the numbers of conductive parts 102 and insulating parts 103 to be formed are not limited at all, and for example, the number of conductive parts 102 may be one, two, three, or five or more in the belt width direction of the harness 101. Of course, the number of insulating parts 103 can be appropriately changed depending on the number of conductive parts 102 to be formed.

The respective conductive parts 102*a* to 102*d* are formed to have constant belt widths in the belt longer direction, and the intermediate insulating parts 103*a* and the outer insulating parts 103*b* have an arrangement relationship of being mutually parallel to the respective conductive parts 102*a* to 102*d* along the belt longer direction. That is, the insulating parts 103*a*, 103*b* are also formed to have constant belt widths in the belt longer direction. In addition, the belt widths of the respective conductive parts 102*a* to 102*d* may be uniformed to the same size or set to different belt width sizes. The same holds true for the belt widths of the respective insulating parts 103*a*, 103*b*.

It is clear that the conductive parts 102*a* and 102*d* arranged on the outer sides in the belt width direction are in contact with corresponding outer insulating parts 103*b* on one adjacent sides of them, and on the sides opposite to the one adjacent sides, in contact with corresponding intermediate insulating parts 103*a*. On the other hand, it is clear that the conductive parts 102*b* and 102*c* arranged on the inner sides of both of the conductive parts 102*a*, 102*d* are in contact with corresponding intermediate insulating parts 103*a* on their both adjacent sides. That is, it can be said that both side parts of any of the conductive parts 102 (102*a* to 102*d*) is arranged sandwiched by corresponding insulating parts 103 (103*a* and/or 103*b*).

First, the conductive parts 102 will be described. The conductive parts 102 are formed of a coated conductive yarn. As described above, in the present embodiment, the conductive parts 102 are adapted to have the knitted structure, and the coated conductive yarn is knitted with the belt longer direction of the conductive part 102 as a course direction in which loops are connected. It is assumed that each conductive part 102 is provided so as to have at least one course, preferably two or more courses. The knitted structure of the knitting will be described later together with the knitted structure of the insulating parts 103.

Note that the "course direction" refers to a direction to advance while forming loops connected in the knitted structure, and is defined as the same direction as the "course". A direction orthogonally intersecting with the course direction on the knitted fabric surface is defined as a "wale" or a "wale direction". Also, "between courses" refers to between courses adjacent in the wale direction, and "the number of courses" refers to the number of courses adjacent in the wale direction.

The coated conductive yarn forming the conductive parts 102 is one formed by coating a conductive yarn with a non-conductive coating material that can be melted at the melting temperature of solder. Between them, the conductive yarn is a wire rod, a fibrous material, or the like having low electrical resistance. The "low electrical resistance" here refers to having a resistance value by which a voltage drop occurring when applying current does not affect any function. A specific resistance value is variously different depending on an application or a use condition. For example, for power feeding, it is 10 Ω/m or less, preferably 1 Ω/m or less, or further desirably 0.1 Ω/m or less; however, an allowable range is different depending on wiring length or supply current. In general, as compared with the power feeding purpose, for a signal, current is typically low, and therefore a higher resistance value is allowable.

As a specific example of the conductive yarn, in addition to a "metallic wire" that is a metallic fiber or wire rod, a "metal-coated wire" in which a metal coating film (such as a thin film or a plating film) is formed by applying surface treatment such as wet or dry coating or plating or depositing an organic or inorganic thin film by vacuum deposition with a metallic or resin fiber or wire rod, an animal or plant fiber, or the like as a core material can be exemplified.

Among them, the metallic wire, the metal-coated wire, and the like have the advantage of being superior in conductivity. For this reason, when using them as the conductive yarn, the harness 101 will be superior in usability as an electrode material. For example, it is suitable for an electrode used for, for example, a battery, a sensor, or the like. Also, it has an extremely wide degree of freedom in terms of applications such as current collectors used for fuel cells of mobile devices, wearable heater electrodes, suspended antistatic sheets, conductive members of mobile acoustic devices such as headphones and microphones, conductive members of movable objects such as printer heads.

Further, the metallic wire, the metal-coated wire, and the like have the advantage of being high thermal conductivity, and therefore it is also possible to utilize the harness 101 as a heat dissipation member or a cooling member. In some cases, it is also possible to make use as a heater (a heat generator).

More specifically, as the conductive yarn, metallic wires formed of pure metals such as gold, platinum, silver, copper, iron, zinc, tin, aluminum, nickel, chromium, titanium, magnesium, vanadium, molybdenum, tungsten, and cobalt, alloys (such as brass and nichrome) of them, stainless steel, and the like can be used. Among them, copper, zinc, aluminum, tungsten, and the like have high thermal conductivities, and therefore suitable when using the harness 101 for heat dissipation or cooling. In contrast, stainless steel has low thermal conductivity, and therefore suitable when using the harness 101 for sound insulation, heat insulation, heat retention, and the like.

A wire diameter when the conductive yarn is formed of the metallic wire is preferably 10 to 300 μm. In particular, it is desirable to use a bundle of small-diameter fibers. As the fiber, not only a long continuous wire but single wires twisted together can be also used. As described, regarding the metallic wire, whether or not it is easily plastically deformed, whether or not it has a remarkable elastic restoration force (spring property), or the like is not particularly limited.

As a surface coated metal when the conductive yarn is formed of the metal coated wire, the various metals exemplified for the metallic wire can be used, and it is only necessary to appropriately make a selection by while focusing on applications (such as applications utilizing conductivity and/or thermal conductivity) required for the harness 101, taking account of corrosion resistance, mechanical strength, cost, easy feasibility of a knitted structure, and/or the like in addition to the applications.

When using a resin fiber or wire rod, or an animal or plant fiber as a core material of the metal coated wire, it is only necessary to perform a wet coating method, a powder deposition method, or the like, in addition to a plating process employed for a resin plating method or the like.

Also, when using a metallic wire rod as the core material, a spraying method, sputtering method, CVD method, or the like can also be employed.

On the other hand, the non-conductive coating material for coating the conductive yarn in the coated conductive yarn forming the conductive parts 102 is required to have non-conductivity in addition to being melted at the melting temperature of solder (approximately 170° C. to 250° C.). Also, one having flexibility and stretchability is recommended.

That is, as the non-conductive coating material, it is preferable to use thermoplastic resin having a melting point that is the same or lower as compared with the melting temperature of solder. In order to make it possible to perform soldering in a short time, surely burn out or shrink the molten non-conductive coating material to prevent blocking of soldering positions, and obtain reliable conduction, it can be said that one having a melting point in a lower temperature range (as an example of a criterion, "150° C. or less" can be cited) within the range of melting temperature of solder is preferable.

However, in order to select the non-conductive coating material, it is not that only a melting point is set as a condition, but that the thickness of the no-conductive coating material coating the conductive yarn, or the like is also set as one of conditions. For example, even when the melting point of the non-conductive coating material is higher (when setting a criterion to 150° C., "higher" refers to temperature exceeding the criterion), when the thickness of the coating is thin, it is relatively easily melted at the time of soldering, and therefore can be used as the non-conductive coating material.

When citing a specific name usable as the non-conductive coating material, there are many, and corresponding examples are listed as follows.

That is, polyurethane, polyvinyl chloride, polypropylene, polyethylene, nylons (including nylon 6, nylon 66, and the like, a generic term for polyamide-based synthetic fibers formed by spinning long continuous chain synthetic polymers based on amide linkages for fiber formation), polyester, polyethylene terephthalate, polybutylene terephthalate, polyphenylene sulfide, polyether ether ketone, fluororesins such as PFA, PVDF, and ETF, polystyrene, polycarbonate, polysulfone, polyether sulfone, and the like.

Note that in the above description, as an example of the criterion for the melting temperature of solder, 150° C. is cited; however, this melting temperature varies depending on resin to be selected as the non-conductive coating material. For example, for polyester, modified polyester, polyester-nylon, or the like, it should be 155° C., it is preferably 105° C. for polyformal, 130° C. for polyurethane, and 180° C. for polyester imide, and so on.

As a method for coating the conductive yarn with the non-conductive coating material (a method for producing the coated conductive yarn), it is only necessary to employ a general coating method including from coating to drying of a molten material. Besides, a method that configures a covering yarn (SCY or DCY) with the conductive yarn as a core material and the non-conductive coating material as a covering material (i.e., a method that forms the coated conductive yarn using the covering yarn), a method that deposits the non-conductive coating material on the conductive yarn by arranging a yarn made of the non-conductive coating material parallel to the conductive yarn to perform knitting, and then performing heat setting, or the like can also be employed.

Next, the insulating parts 103 will be described. The insulating parts 103 are formed of a non-conductive yarn having heat resistance to the melting temperature of solder. The heat resistance required for the non-conductive yarn forming the insulating parts 103 here refers to the non-occurrence of ignition or melted loss even due to contact with molten solder (or with a soldering iron in a heated state) or to the prevention of easy burning out. Note that at least the occurrence of burnt deposit is assumed to be within an allowable range (employable for forming the insulating part 103). In short, as long as the non-conductive yarn has heat resistance enough to leave the form thereof even after soldering, it is functionally sufficient. In order to assist the action of preventing molten solder from permeating through the insulating parts 103, it is further preferable to add measures such as forming the knitted structure of the insulating parts 103 as dense structure.

Note that such heat resistance required for the insulating parts 103 is necessary at contact positions with the conductive parts 102, and therefore the whole of each insulating part 103 in the belt width direction does not necessarily have to have the same configuration.

For example, it is also possible to provide only one course or a few courses contacting with the conductive parts 102 with the heat resistance, and to knit course parts (such as the central part of the insulating part 103 in the belt width direction) not directly contacting with the conductive parts 102 employing general knitted structure or a general material (one not having heat resistance to molten solder). In addition, the heat resistance is not limited to being provided throughout the length of a course, and in some cases, it is also possible to knit parts (non-soldering positions) in the course direction employing a general material (one not having heat resistance to molten solder).

As described above, in the present embodiment, the insulating parts 103 are also formed to have the knitted structure, and the non-conductive yarn is knitted with the belt longer direction of the insulating parts 103 as the course direction in which loops are connected (the same as the belt longer direction of the conductive parts 102). As with the conductive parts 103, it is assumed that each insulating part 103 is also provided so as to have at least one course, preferably two or more courses.

As the knitted structure employable for the insulating parts 103, plain-knitted, rib-knitted, smooth-knitted, or purl-knitted structure, or any of their derivative structures (such as Milano rib and double-knitted structures) can be employed. In addition, regarding the knitted structure, for the conductive parts 102 as well, the same knitted structure can be employed, and the following description can be applied in common. Of course, to knit the conductive parts 102 and the insulating parts 103, not only a circular knitting machine, but a flat knitting machine or the like can be used. Also, without limitation to any of the structures knitted by weft knitting as listed, structures (such as tricot-knitted, raschel-knitted, or Milanese-knitted structures) knitted by warp knitting is also possible.

In addition, as far as the insulating parts 103 are concerned, in order to enhance stretchability, it is possible to insert an elastic yarn generating a tightening force in the course direction. For the elastic yarn, polyurethane or a rubber-based elastomer material can be used, or a covering yarn using polyurethane or an elastomer material as a "core" and nylon or polyester as a "cover", or the like can be employed. As a method for inserting the elastic yarn, in addition to forming the non-conductive yarn while using a synthetic fiber simultaneously, plating knitting, plating yarn feeding, inlay knitting, and the like can also be employed.

The "stretchability" here refers to a property including both elongation from a non-elongation state (an original state) and immediate restoration due to release from the elongation state. With a goal of making wrinkles, flapping, and/or the like inconspicuous as the whole of the harness 101, or suppressing stretchability so as to prevent the conductive parts 102 from being damaged when placing an elongation load, stretchability only has to be set.

The degree of elongation from the non-elongation state (an elongation degree) can be handled by, as desired, appropriately changing various factors such as the material and thickness of a component (yarn) used for knitting, whether or not knitting components are used simultaneously, methods for using the knitting components simultaneously (such as covering, plating, and paralleling), the number of components to be used simultaneously, the belt width, belt length, and the like of the harness 101. Also, it goes without saying that the elongation degree can also be appropriately changed by selecting component structure.

For example, when requiring powerful behavior exhibiting rapid restoration (return) from elongation, a relatively thick elastic yarn having ferroelasticity is selected. On the other hand, when requiring slow behavior exhibiting gradual restoration from elongation, a relatively narrow elastic yarn having weak elasticity is selected.

In order to further enhance stretchability, there is also a method of using a thick polyurethane yarn or using a polyurethane yarn having high elastic modulus resulting in a high restoration force (kickback) against elongation with a draft increased (loop length decreased).

In addition, when it is not necessary to enhance stretchability or stretchability is not required, it is only necessary to form any one or both of the conductive parts 102 and the insulating parts 103 so as to have woven structure. For the woven structure, plain weave, twill weave, satin weave, leno weave, or the like can be employed.

As specific examples of the non-conductive yarn forming the insulating parts 103, in addition to various natural fibers such as cotton and wool, glass fibers, ceramic fibers, carbon fibers, and various synthetic fibers (such as polyester fibers, nylon fibers, phenol fibers, PBO, polyarylate, polyimide, melamine, PPS, PEEK, PTFE, cellulose fibers (flame retarding), nylon (flame retarding), and acrylic fibers), and the like can be exemplified.

The harness 101 as described can be produced by employing, for example, a method described in Japanese Unexamined Patent Application Publication No. 11-279937 (a method for taking tape fabric out of cylindrical fabric) or the like. That is, this is a method that takes out the harness 101 while spirally separating it by, when knitting the cylindrical fabric using a circular knitting machine, performing knitting that knits a total of nine sections, i.e., the outer insulating part 103*b*, conductive part 102*a*, intermediate insulating part 103*a*, conductive part 102*b*, intermediate insulating part 103*a*, conductive part 102*c*, intermediate insulating part 103*a*, conductive part 102*d*, and outer insulating part 103*b*, while switching a yarn to be fed between the non-conductive yarn for the insulating parts 103 and the coated conductive yarn for the conductive parts 102, as well as inserting connecting yarns dissolvable by heat, water, a solvent, or the like between pieces, and performing a process of dissolving the connecting yarns from the resulting cylindrical fabric after the knitting.

In the harness 101 of the present invention, performing such knitting allows the connecting parts between the conductive parts 102 and adjacent insulating parts 103 to be integrated.

As is clear from the above detailed description, since even though the harness 101 has high flexibility against a bend, a twist, and the like, it holds non-conductivity on both of the front surface and back surface thereof (including the front and back surfaces of the conductive parts 102), even when the harness 101 contacts with another conductor, a disadvantageous short-circuit, electric leak, and/or the like through the front and/or back surfaces of a conductive part 102 do not occur.

In addition, soldering to the conductive parts 102 is possible at an arbitrary position, and as necessary, it can also be configured to provide flexibility. For this reason, in a case such as when providing wiring among multiple boards, and wiring paths have complicated curves because of the arrangement of each board, wiring lengths or wiring paths are not fixed before a wiring stage, the boards are mutually moved after the wiring, or the action of a moving body causes large repeated stretching variations in wiring lengths under a situation where between the boards and the moving body, wiring is provided, it is also possible to make use as a preferred wiring member.

Regarding the conductivity of a conductive part 102 (each conductive part 102*a* to 102*d*) in the present invention harness 101, the magnitude of electrical resistance is set in the belt longer direction of it depending on the distance between two points to be electrically connected. In addition, in the strict sense, the conductivity in the course direction is exhibited in units of one course of the coated conductive yarn forming the conductive part 102. For this reason, when it is possible to widely set the belt width of the conductive part 102 (to increase the number of course), and appropriately adjust the number of courses to be soldered when performing soldering, the adjustment of the number of courses allows the magnitude of electrical resistance to be adjusted to some extent.

In addition, in order to decrease an electrical resistance value of one course, for the coated conductive yarn used for the one course, it is only necessary to increase the thickness of the conductive yarn to be used, increase the number of conductive yarns, or select a material having low electrical resistance.

In doing so, the harness 101 of the present invention can respond not only to applications requiring conductivity in electronic and electrical fields, but to a wide variety of applications such as applications requiring thermal conductivity. Also, in the case of a configuration having flexibility, since the electrical resistance is unchanged between elongation and non-elongation, it is possible to preferably make use as a signal line avoiding disturbance as well.

In some cases, a use method such as performing solder plating entirely on the front surfaces of some or all of the conductive parts 102 to peel their coatings (non-conductive coating material) is also possible (preferable in the case of heat dissipation, cooling, or enhancement of the thermal conductivity of a heater or the like).

EXAMPLES

In the following, examples of the present invention harness 101 will be exemplified; however, these are ones disclosed in order to facilitate technical understanding, and the technical scope of the present invention is not limited to the following exemplifications.

As an overall configuration, two conductive parts 102 and three insulating parts 103 (one intermediate insulating part 103*a* and two outer insulating parts 103*b*) were provided, and among the insulating parts 103, the outer edge parts of the two outer insulating parts 103*b* were provided with reinforcing edges formed of an adhesive yarn in common; then a conductive yarn for knitting the conductive parts 102, a non-conductive yarn for knitting the insulating parts 103, and knitted structure were changed to knit Examples 101 to 103 of the present invention harness 101 and a comparative example harness (Comparative Example 100); and a test to check whether or not these were solderable was performed.

In addition, the conductive parts 102 were configured to have three courses each; the insulating parts 103 were configured to have two courses each; and a two course configuration was also set common to the reinforcing edges.

The details of Examples 101 to 103 and Comparative Example 100 are listed in Table 100.

be a yarn adapted to restrict elongation by a twist or knitted structure) can also be used simultaneously.

When insulating parts 103 are arranged so as to sandwich both sides of a conductive part 102, they are not limited to being structured mutually independently on both sides of the conductive part 102. For example, it is possible to form an insulating part 103 so as to have a width size corresponding to the entire belt width of the harness 101, and arrange a conductive part 102 on the insulating part 103 in a predetermined arrangement. That is, in a location where the conductive part 103 is provided, there is provided a structure where the conductive part 102 is knitted onto the insulating part 103 or a double structure where the conductive part 102 and the insulating part 103 are stacked.

As described above, a reason to describe as the "principle" that the front and back surfaces of the conductive parts 102 and the front and back surfaces of the insulating parts 103 form the front and back surfaces of the harness 101 (or are exposed) is because the knitting or stacking formation of a conductive part 102 on an insulating part 103 prevents the exposure of the back surface of the conductive part 102 (and the front surface of the insulating part 103 covered with the conductive part 102).

TABLE 100

| | Example 101 | Example 102 | Example 103 | Comparative example 100 |
|---|---|---|---|---|
| Conductive yarn [thickness × number of yarns] | Polyurethane copper wire [ϕ40 μm × 3] | Polyurethane-nylon copper wire [ϕ40 μm × 3] | Polyurethane copper wire [ϕ40 μm × 3] | Polyurethane-nylon copper wire [ϕ40 μm × 3] |
| Non-conductive yarn [thickness] | Para-aramid fiber [222 dt] | Meta-aramid fiber [222 dt] | Carbon fiber blended material [222 dt] | Nylon 6 [222 dt] |
| Elastic yarn [thickness] | Polyurethane [155 dt] | Polyurethane [155 dt] | Polyurethane [155 dt] | Polyurethane [155 dt] |
| Knitted structure | Fraise | Single | Smooth | Fraise |
| Electrical resistance [Ω/5 cm] | 0.2 | 0.2 | 0.2 | 0.2 |
| Solderable or not | ○ | ○ | ○ | x (Nylon is melted) |

* dt stands for dtex.

As is clear from Table 100, in Comparative Example 100 in which as the non-conductive yarn forming the insulating parts 103, nylon 6 having a low melting point was used, it has been confirmed that the melted loss of the insulating parts 103 (the problem of the deformation or disappearance of nylon 6 due to soldering heat) occurs at the time of soldering, and as a result, the action of supporting the conductive parts 102 from both sides to keep shape and the action as a spacer between the conductive parts 102 cannot be sufficiently held.

Meanwhile, the present invention is not limited to the above-described embodiment, but can be variously modified depending on an embodiment.

For example, the harness 101 is not limited to being knitted as the cylindrical fabric, but may be knitted in a non-cylindrical sheet shape. Accordingly, it can be knitted by a general-purpose knitting machine such as a circular knitting machine or a flat knitting machine.

The harness 101 has many applicable fields such as clothing (as a wearable material and the like) in addition to the above-described power feeding, signal, medical applications.

In a conductive part 102 or an insulating part 103, providing at least one course is theoretically sufficient; however, the extent to which the number of courses is increased each is not limited at all. For this reason, the harness 101 can also be formed in a line shape or a wide belt shape.

For the insulating parts 103, a knitting yarn for restricting elongation (which is preferably a non-elastic yarn but may For the harness 101, a use method adapted to connect to another general wiring member can also be employed. For example, a use method is available, such as when a wiring distance is fixed, arranging the harness 101 in each of both end parts or one end part (in some cases, in an intermediate part) requiring soldering, and connecting the rest using a general wiring member (such as a wiring cord).

REFERENCE SIGNS LIST

1 Conductive stretchable knitted fabric (present invention knitted fabric)
2 Harness
3 Non-conductive part
4 Non-conductive part
10 Conductive yarn
10*a* Conductive yarn old loop
10*b* Conductive yarn old loop
11 Elastic yarn
11*a* Elastic yarn old loop
11*b* Elastic yarn old loop
13 Crossing part
20 Loop
20*a* Plain-knitted loop
20*b* Plain-knitted loop

21 Loop
101 Harness
102 Conductive part
103 Insulating part

The invention claimed is:

1. A harness for conduction, comprising:

a conductive part knitted using a conductive yarn and an elastic yarn simultaneously and a non-conductive part knitted using only a non-conductive yarn, wherein the conductive part is such that at least the conductive yarn is provided in a zigzag arrangement in a front-back direction in a knitted fabric and the elastic yarn is provided in an arrangement that generates a tightening force along a surface direction parallel to front and back surfaces of the knitted fabric to keep a shape of the zigzag arrangement of the conductive yarn, wherein the conductive part includes a constituent path employing a metallic wire as the conductive yarn, and wherein the non-conductive part includes a constituent path employing a synthetic fiber as the non-conductive yarn.

* * * * *